G. W. McMILLON.
Animal-Trap.

No. 204,064. Patented May 21, 1878.

WITNESSES
John F. Blackmar
Robert Everett

INVENTOR.
George W. McMillon
Gilmore, Smith & Co.
ATTORNEYS.

UNITED STATES PATENT OFFICE.

GEORGE W. McMILLON, OF MANCHESTER, TENNESSEE.

IMPROVEMENT IN ANIMAL-TRAPS.

Specification forming part of Letters Patent No. 204,064, dated May 21, 1878; application filed April 6, 1878.

*To all whom it may concern:*

Be it known that I, GEORGE W. MCMILLON, of Manchester, in the county of Coffee and State of Tennessee, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1:
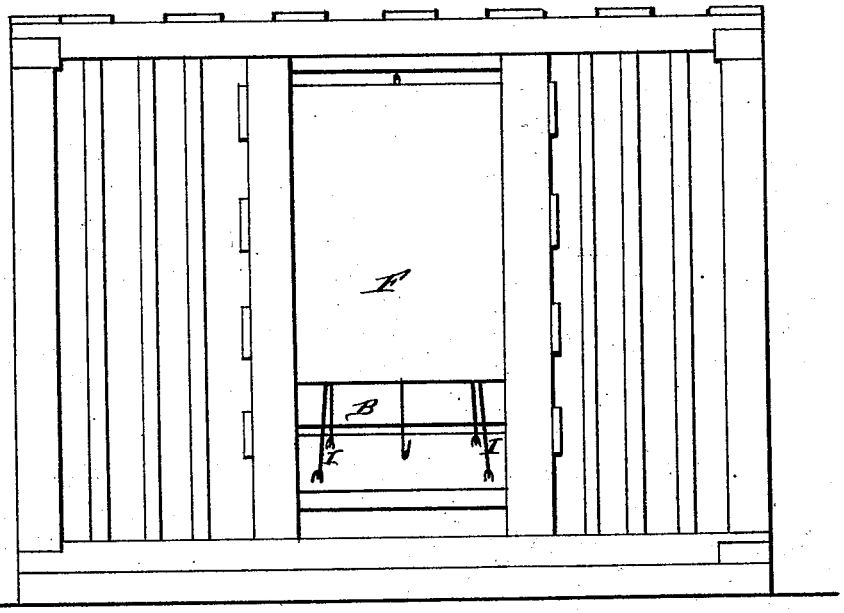
Figure 2:
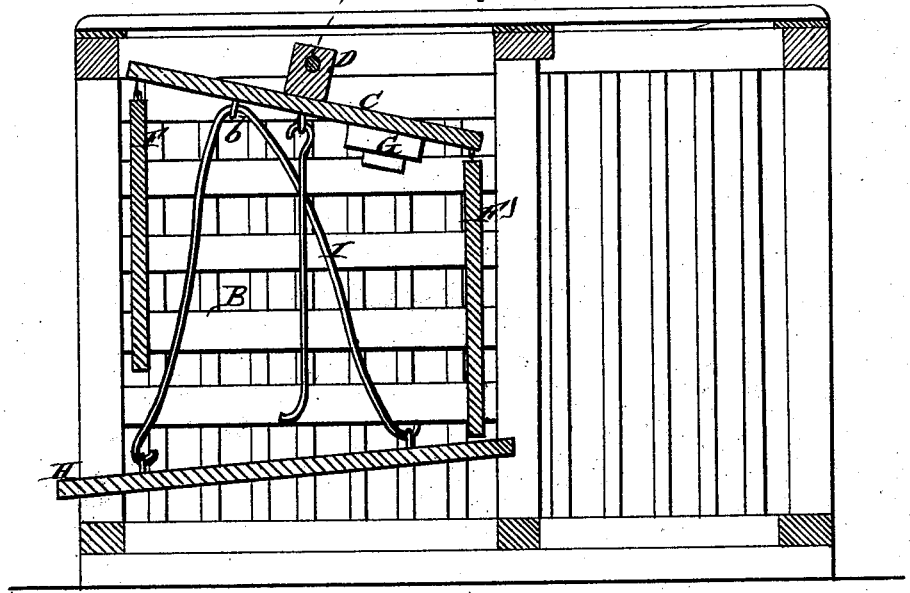

Figure 1 of the drawings is a representation of a front view of my animal-trap, and Fig. 2 is a part sectional side view thereof.

The nature of my invention consists in the construction and arrangement of an animal-trap, as will be hereinafter more fully set forth.

The annexed drawings, to which reference is made, fully illustrate my invention.

A represents an exterior cage of any suitable form and size, provided with an interior chamber, B, opening in one side of the cage. The roof of this chamber B is formed of a board, C, which is secured to a bar, D, having a journal, a, at each end, said journals being placed in suitable bearings in the sides of the chamber. To the ends of the board C are flexibly connected two pendent gates or doors, F and F', for closing alternately the outer and inner ends of said chamber B. In staples b b at the sides of the board C, and in front of the axis of said board, are suspended two bails or stirrups, I I, the ends of which are connected to and suspend a platform, H, which forms the bottom of the chamber B, and which also extends forward through the entrance in the side of the cage A to the chamber B. The inner end of the board C is provided with a weight, G, which tilts the board so as to keep the door F elevated and the door F' depressed, or, in other words, opening the outer and closing the inner end of the chamber B.

The bait should be arranged in any suitable manner at or near the inner end of the chamber B. The animal, in entering this chamber to get at the bait, must, of course, pass onto the platform H, and as soon as the animal passes beyond the outer ends of the bails or stirrups I the weight of the animal will at once cause a powerful leverage to be exerted on the board C, and said board will tilt, so that the outer door F will close and the inner door F' open, closing in the animal, and compelling it to pass into the cage A. As soon as the animal, in passing into the cage, leaves the platform H the weight G causes the trap to set itself again, ready for the admission of another one.

I am aware that tilting platforms and tilting top boards, with outer and inner doors, in animal-traps are not new, and I do, therefore, not claim such, broadly, as my invention.

What I claim as new, and desire to secure by Letters Patent, is—

The combination, with the cage of an animal-trap, of the weighted tilting top board C, forming the roof, with inner and outer doors F F', the stirrups I I, and platform H, operated in the manner as described.

In testimony that I claim the above I have hereunto subscribed my name in the presence of two witnesses.

GEORGE W. McMILLON.

Witnesses:
P. C. ISBELL,
B. M. TILLMAN.